Figure 1:
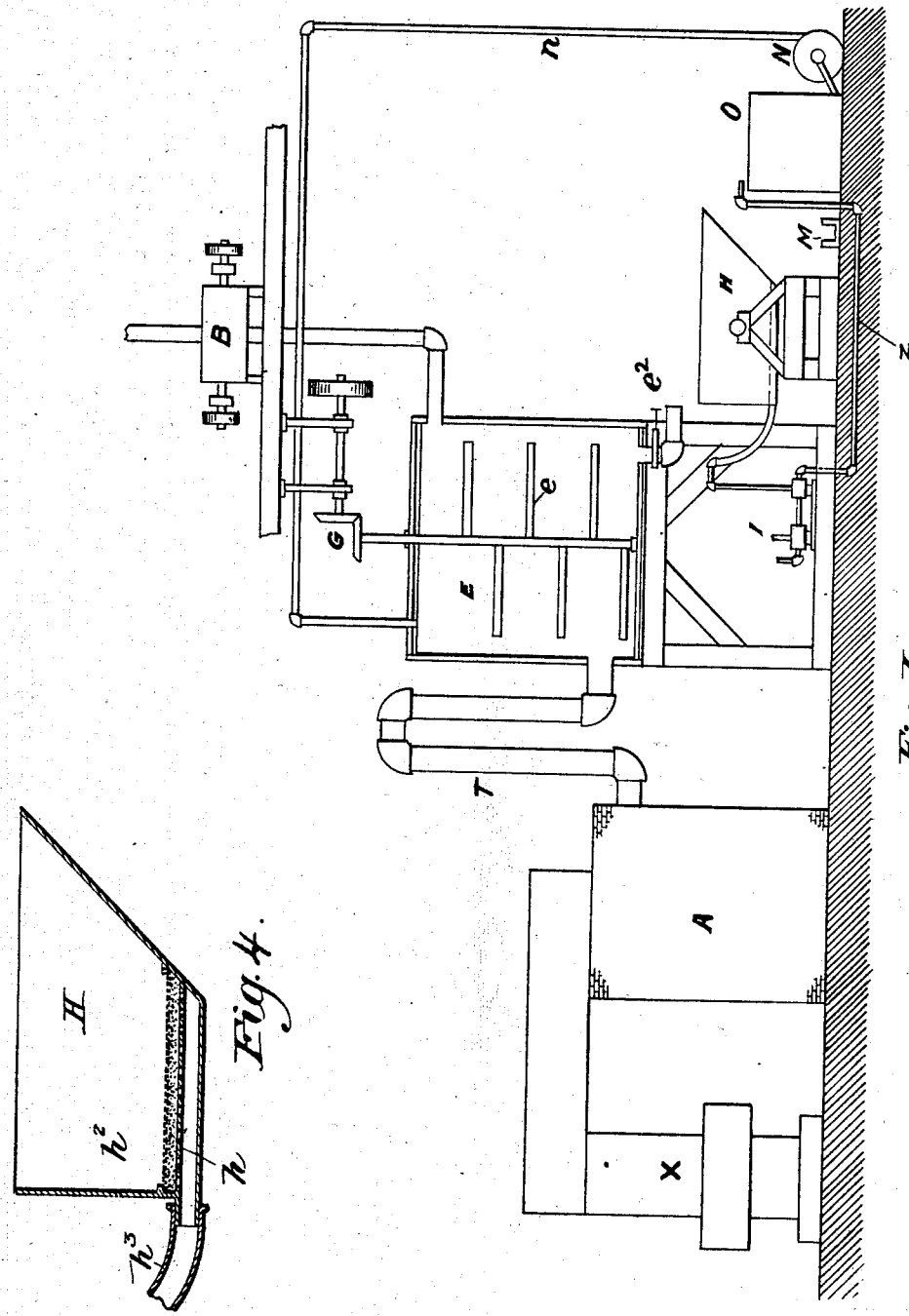
Figure 2:
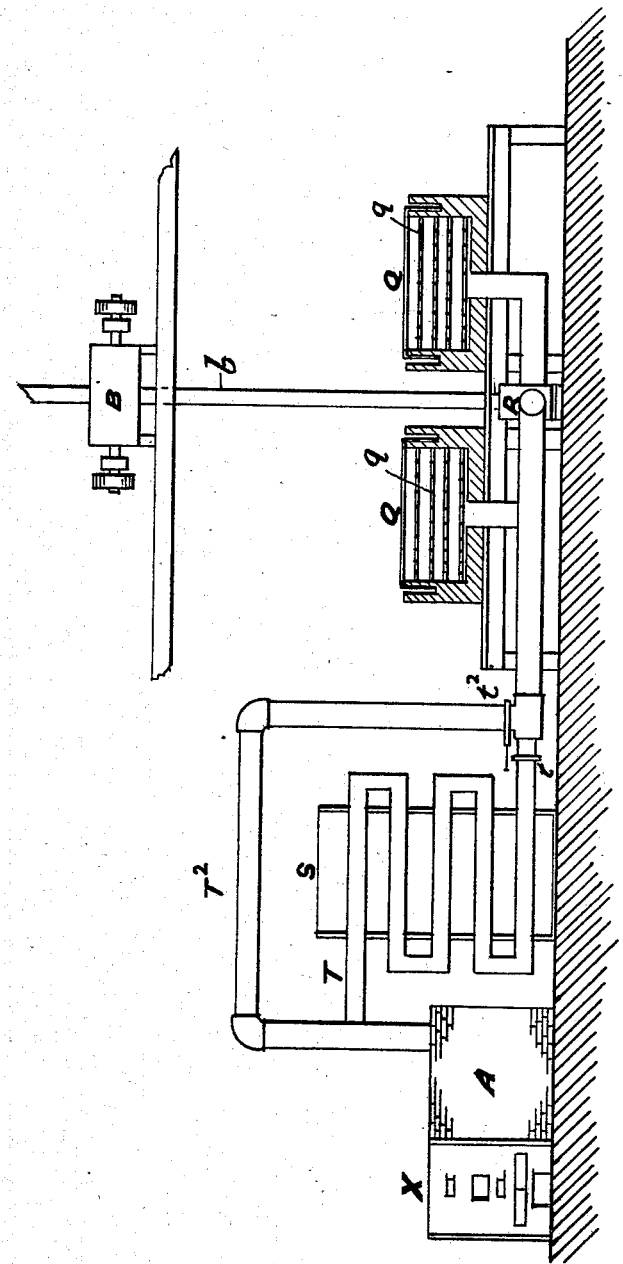
Figure 3:
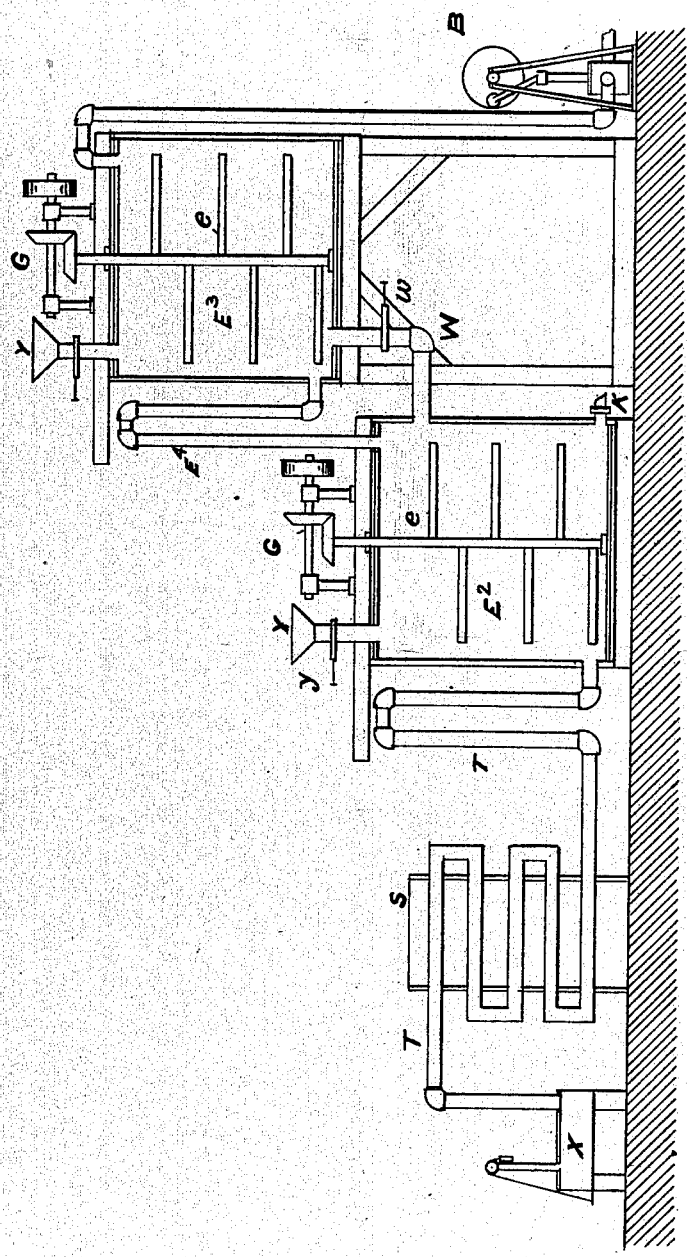

No. 716,330. Patented Dec. 16, 1902.
H. H. WING.
PROCESS OF MAKING SULFITE COMPOUNDS.
(Application filed Mar. 26, 1900.)
(No Model.) 3 Sheets—Sheet 3.

United States Patent Office.

HERBERT H. WING, OF BUFFALO, NEW YORK.

PROCESS OF MAKING SULFITE COMPOUNDS.

SPECIFICATION forming part of Letters Patent No. 716,330, dated December 16, 1902.

Application filed March 26, 1900. Serial No. 10,178. (No specimens.)

*To all whom it may concern:*

Be it known that I, HERBERT H. WING, a citizen of the United States, residing at Buffalo, in the county of Erie and State of New York, have invented certain new and useful Improvements in Processes of Producing Sulfite Compounds and By-Products; and I do hereby declare the following to be a full, clear, and exact description of the invention, such as will enable others skilled in the art to which it appertains to make and use the same.

The object of my invention is to improve upon the present processes for making sulfite salts and solutions and to effect not only improvements in the quality of the products, but also economy in the carrying out of the process, all as hereinafter fully described.

For convenience I will describe my invention as applied to the obtaining of sulfite salts and solutions suitable for use in the manufacture of fiber such as is used in paper-making, it being of course understood that the products obtained are not limited solely to such use.

The usual method of making the bisulfite liquors used in making sulfite fiber is to burn sulfur or pyrites and conduct the sulfur gases thus produced into a solution of lime in water or into a tower filled with limestone or dolomite and continue the passage of such sulfur gases until the bisulfites are produced, and they being soluble a clear solution is obtained, which is then ready to use for boiling the wood chips. As the solutions thus obtained seldom contain more than ten per cent. of dissolved bisulfites, they are always made where they are to be used, as the expense of transporting them any considerable distance would be prohibitive from an economical point of view. It has therefore become the usual practice to bring the sulfur or pyrites to the paper-mill and make the bisulfites at the place of consumption.

By means of my process I am able to make use of sulfur fumes which are produced in locations where it remains a necessity to continue to produce them and where it would not be economical to erect a pulp-mill to utilize the gases at such locality. Besides being able to utilize sulfur fumes which could not be economically utilized either by making them into sulfuric acid by the usual processes or by making them into liquid sulfurous acid by the method of absorbing them in water and then expelling them by heat and then compressing the $SO_2$ gas and shipping it in iron cylinders, my process also possesses the advantage that the bisulfite liquors produced by it are better and more cheaply obtained. Among other advantages which might be enumerated is the cheaper cost of producing the bisulfite liquors at the paper-mills on account of requiring less labor and apparatus to make a certain quantity of bisulfite liquor by use of the monosulfite in their absorbing apparatus in place of lime, limestone, or dolomite.

My process, in general terms, consists, first, in producing a monosulfite of the alkaline-earth metals or magnesium at the locality where the sulfur fumes are produced, then separating the monosulfites from the water, if any were used in their production, and, second, adding them subsequently to a fresh quantity of water which is preferably at a lower temperature and may be obtained at the locality where they are to be used, and then making a bisulfite solution by passing sulfur fumes through the liquor to which the monosulfites were added. It is thus apparent that the amount of sulfur or pyrites required to be shipped and handled at the paper-pulp mills will be only one-half that used in the ordinary process of making the bisulfite liquors, while all the lime or limestone required is contained in the monosulfite and no lime or limestone will be needed at all. Besides being able to utilize sulfur fumes which would otherwise be of no value, but instead a great nuisance, in the production of a bisulfite liquor by passing only the fumes necessary to form a bisulfite from a monosulfite in a certain quantity of liquor, there will be less heat generated, as the heat of formation of bisulfite in this reaction is much less than that of the formation of the bisulfite from the lime in one continuous reaction, and whereas at some seasons of the year the temperature of the water used and the heat added to the solution by the above chemical reactions makes the temperature so high that it is difficult to produce a bisulfite solution, owing to the fact that the bisulfite solution decomposes at about 104° Fahrenheit into monosulfite and $SO_2$, so that at that temperature the $SO_2$ passed into the emulsion of monosulfite simply passes through and is wasted without producing any change in the monosulfite. By my process it is possible to produce a stronger solution without difficulty or risk of decomposition, and on account of less heat being generated by the chemical reactions the advantage of a stronger solution of free sulfurous acid along with the bisulfite can be obtained.

To carry out my process of making the bisulfite liquor, a variety of different forms of apparatus may be used. I have shown forms of apparatus in Figures I and II, in either of which I can produce the monosulfite and then complete the work by the use of an apparatus such as is shown in Fig. III.

Fig. I is an elevation, partly in section, of an apparatus for producing monosulfites. Fig. II is an elevation, also partly in section, of an apparatus in which monosulfites may be produced with the use of less moisture than in the apparatus shown in Fig. I. Fig. III is an elevation, partly in section, of an apparatus for converting monosulfites into bisulfites. Fig. IV is a sectional detail of the filtering-tank H.

In the drawings, X represents a source from which sulfur dioxid or gases containing it may be obtained and may be a smelting-furnace, ore-roaster, or any apparatus from which fumes containing $SO_2$ can be obtained.

A represents a dust-collecting chamber for settling out any dust carried by the fumes or gases.

S represents a cooling device.

T $T^2$, &c., represent the pipes or flues which convey the fumes or gases to the converting apparatus and which may be carried through the cooling device S for the purpose of cooling the gases, if preferred.

B represents a suction-fan or blower for drawing the fumes or gases through the various apparatus.

E $E^2$ $E^3$ represent tanks provided with means for agitating the contents, and G represents the mechanism for operating the agitators $e$.

H represents a receiving-tank, preferably mounted on trunnions and which is provided with a perforated false bottom $h$ and filtering material $h^2$, (see Fig. IV,) which tank is connected by suitable flexible connections $h^3$ to a pump I, whereby the liquid contents of tank H may be drained away from the solid matters, leaving the latter dry or semidry.

M represents a trough or conveyer into which the drained contents of tank H may be emptied, as by tipping the same, and by which the said contents may be conducted to any other desired apparatus—as, for instance, to a filter, press, or drier.

O represents a vat or tank for preparing milk of lime.

N is a pump for pumping the milk of lime through a pipe $n$ to the tank E.

Q Q represent closed chambers having perforated or slotted shelves $q$ $q$.

R represents a common "center seal" for governing the flow of the gases, and $t$ and $t^2$ represent cut-off valves in the pipes T $T^2$.

Y represents feeding-hoppers, and $y$ valves therein.

$z$, Fig. I, represents a pipe for conducting the liquid pumped from the tank H to the vat O.

The method of operating the apparatus shown in Fig. I consists in first passing the gases from X, containing the $SO_2$, through the dust-settling chamber A. They are then drawn through the absorbing apparatus E by means of the suction maintained by the suction-blower B. The absorber E is nearly filled with a solution of milk of lime, which is prepared in the tank O and delivered to the absorber E by the pump N through the pipe $n$. The solution of the milk of lime is kept agitated by means of the agitator $e$ and mechanism G, which is continuously operated. By continuing to pass the sulfur gases into the solution of milk of lime the sulfite of calcium is produced and being insoluble is precipitated. This operation is continued until all the lime is converted into the monosulfite, which can be ascertained by testing the liquor from time to time for free lime. The valve $e^2$ at the bottom of the absorber is then opened and the contents of tank E discharged into the filter-tank H. The monosulfite of calcium being insoluble is in the form of a white mud, from which the water is drained by drawing it through the filter and perforated bottom of the tank H by the pump I, leaving a dry or semidry mass in the tank. In case the passage of $SO_2$ gas through the solution was discontinued before all the lime in the milk-of-lime solution was converted into monosulfite the precipitate is washed to dissolve all the lime which may be in it, thus rendering it pure. The waste water may be returned through pipe $z$ to the tank O for the production of a further quantity of milk of lime, or it can be thrown away when by repeated use it has dissolved impurities sufficient to render its use objectionable. In case the passage of the fumes should be continued beyond the proper time to form only the monosulfite and some bisulfite is formed or some sulfurous acid remains in the solution which passes through the filter by returning it to the tank O to be used to make a new batch the bisulfite and sulfurous acid in solution form monosulfites on coming in contact with the milk of lime, and they are returned to the absorber E and are finally collected on the filter in vessel H. The calcium monosulfite is removed from the vessel H and may be shipped at once, but is preferably further dried previous to being used for the second step of the process—viz., the production of the bisulfite liquor.

When it is desirable to make the monosulfite of magnesium to be used mixed with the calcium monosulfite, the method of operating my process consists in making a milk of lime and magnesium by using a lime obtained by burning dolomite, limestone, or equivalent material. This liquor is conducted to the absorber E, through which the sulfur fumes are drawn, whereby the monosulfites of calcium and magnesium are produced. As the calcium monosulfite is very insoluble and the magnesium monosulfite nearly so, they are both precipitated and are collected on the filter in vessel H, from which they are removed and preferably further dried previous to being used for the second operation of the process—viz., the production of the liquor containing the bisulfite of calcium and magnesium.

When it is desired to make only the monosulfite of magnesium, as the first part of my process calcined magnesia or carbonate of magnesium, known as "magnesite rock," or other equivalent magnesium compound is used, and the apparatus shown in Figs. I, II, and IV can be used.

In the various methods above described for utilizing the fumes from ore-roasting, smelting, or other furnaces as the first step in my process the absorption of the sulfur-dioxid gas by the alkaline-earth bases has always been in the presence of water, and the results are obtained by separating the monosulfites from a body of water. As these monosulfites can be obtained in an economical manner without the presence of so much water, a form of apparatus suitable for accomplishing this result is shown in Fig. II of the drawings. The method of operating this apparatus consists in passing gases from the roaster X, containing the $SO_2$, through the dust-collecting chamber A. They are then forced by the suction-blower B partly through the cooler S, by which a portion of the gases are cooled, the amount being regulated by opening and closing the valves $t$ and $t^2$, then through the absorbers Q Q, which are provided with slotted or perforated racks or plates $q$, on which is placed moistened slaked lime obtained from burning ordinary limestone or dolomite. The reaction would take place with the oxid in the presence of moisture; but as such moisture if present would at once hydrate the oxid the hydrate is taken and a slight amount of moisture only is added to start the reaction, which then furnishes its own moisture. The sulfur dioxid contained in the fumes combines with the slaked lime in their passage over and through the perforated shelves holding it, and this combination generates considerable heat, according to the amount of gas passed through the absorber, as well as the percentage of $SO_2$ in the gas. The reaction is

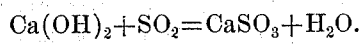
$$Ca(OH)_2 + SO_2 = CaSO_3 + H_2O.$$

The heat of the combination of the monosulfite, together with that of the gases entering the absorber, is generally such that the molecule of water liberated in the above reaction, as well as any moisture mechanically contained in the slaked lime, is evaporated and passes out of the exit-pipe $b$, leaving the monosulfite in a dry condition when the operation is completed. When it is desirable to make a mixture of the monosulfites of calcium and magnesium, the lime obtained from burning dolomite is used. When the single monosulfite of calcium is desired, the lime obtained from burning ordinary limestone only is used. When the single monosulfite of magnesium is desired, calcined magnesia or equivalent is used to make the magnesium hydrate for filling the absorbers Q Q.

The second part of my process—namely, the production of the bisulfite liquor—can be carried out in a form of apparatus which is shown in Fig. III, in which X is a sulfur-burner, or any apparatus from which fumes containing $SO_2$ are obtained. S is a cooler. T is a pipe leading through the cooler S to an absorber $E^2$, which consists of a tank equipped with a stirring apparatus $e$, operated by the mechanism G. Y is a feeding arrangement and is provided with a valve $y$. K is an outlet-pipe provided with a valve $k$. $E^3$ is a second absorber connected to $E^2$ by the pipe $E^4$ for the gases and by the pipe W, having the valve $w$ for the liquids. B is a vacuum-pump.

To carry out the second part of my process—namely, the production of bisulfite liquors—in this apparatus, the gases containing $SO_2$ obtained from the sulfur-burner X or other source are passed through the cooler S, by which they are cooled. The absorbers $E^2$ and $E^3$ having previously been nearly filled with water and a certain quantity of monosulfites obtained by the first step of my process fed into the water through the spout Y and the valve $y$ closed, gases are then drawn through the pipe T into the absorber $E^2$ and out through the pipe $E^4$, then through the absorber $E^3$ by means of the vacuum-pump B. The $SO_2$ gas in the fumes on coming into contact with the water forms sulfurous acid, and that on coming in contact with the monosulfite which is distributed throughout the mixture by the agitator forms a bisulfite, which remains in solution. Two or more absorbers are preferably used in series, so that the exit-gases from $E^2$, which contain traces of $SO_2$, are completely absorbed in the second or third absorber. The absorbers can be worked so that the charge in $E^2$ is completed and then run out at K, and then the charge in $E^3$ is run in by opening the valve $w$. It is then completed in $E^2$, while a fresh charge is made up in $E^3$. As the heat of formation of a bisulfite from a monosulfite, together with the heat of formation of the $SO_2$ with water, is less than that of the formation of the bisulfite directly from the hydrate, together with that of the $SO_2$ with water, the liquor is comparatively cool, and any desired strength of bisulfite with free sulfurous acid can be easily and rapidly obtained.

Inasmuch as it is clearly apparent from the foregoing that in my process the compounds of the alkaline-earth metals or of magnesium which may be used are those which are decomposable by sulfur dioxid in the presence of moisture, as the oxid, hydrate, or carbonate, which are all oxygen compounds, or, briefly, oxycompounds, of such metals, and as the compounds of magnesium may be used equally with the corresponding compounds of the metals calcium, barium, strontium, &c., and in combination therewith, it is to be understood that in the claims I have included magnesium in the term "alkaline-earth metals" in order to avoid the use of alternative terms, although I am aware that some chemists now distinguish between magnesium and the other metals classed as alkaline-earth metals.

What I claim as my invention is—

1. The herein-described process of producing sulfite compounds which consists in submitting an oxycompound of an alkaline-earth metal decomposable by sulfur dioxid in the presence of water to the action of gases containing sulfur dioxid, whereby a monosulfite of such metal is formed; then separating such monosulfite from the water in which it was formed subsequently adding it to a fresh quantity of water; and then bringing sulfur-dioxid gas in contact therewith, whereby the monosulfite is converted into bisulfite.

2. The herein-described process of producing sulfite compounds which consists in submitting oxycompounds of alkaline-earth metals containing magnesium, decomposable by sulfur dioxid in the presence of water to the action of gases containing sulfur dioxid, whereby a monosulfite of such metal is formed; then separating such monosulfite from the water in which it was formed; subsequently adding it to a fresh quantity of water; and then bringing sulfur-dioxid gas into contact therewith, whereby the monosulfite is converted into bisulfite.

3. The herein-described process of producing sulfite compounds which consists in submitting an oxycompound of calcium and magnesium decomposable by sulfur dioxid in the presence of water to the action of gases containing sulfur dioxid, whereby a monosulfite of such metal is formed, then separating such monosulfite from the water in which it was formed; subsequently adding it to a fresh quantity of water, and then bringing sulfur-dioxid gas into contact therewith, whereby the monosulfite is converted into bisulfite.

4. The herein-described process of producing sulfite compounds which consists in submitting the hydrate of an alkaline-earth metal in the presence of water to the action of gases containing sulfur dioxid, whereby a monosulfite of such metal is produced, then separating said monosulfite from the water in which it was produced; subsequently adding it to a fresh quantity of water, and then bringing sulfur-dioxid gas into contact therewith, whereby the monosulfite is converted into bisulfite, substantially as described.

5. The herein-described process of producing sulfite compounds which consists in submitting the hydrate of calcium and magnesium in the presence of water to the action of gases containing sulfur dioxid, whereby monosulfites of such metals are produced; then separating said monosulfites from the water in which they were produced; subsequently adding them to a fresh quantity of water, and then bringing sulfur-dioxid gas into contact therewith, whereby the monosulfites are converted into bisulfites substantially as described.

In testimony whereof I hereto affix my signature in presence of two witnesses.

HERBERT H. WING.

Witnesses:
FREDERICK K. WING,
LOUIS F. WING.